May 14, 1963  J. W. LONG  3,089,256
METHOD AND APPARATUS FOR PRODUCING VISUAL DISPLAY
Filed June 7, 1960  7 Sheets-Sheet 1

United States Patent Office 3,089,256
Patented May 14, 1963

3,089,256
METHOD AND APPARATUS FOR PRODUCING VISUAL DISPLAY
Jack W. Long, 851 Cloverview Ave., Cincinnati 31, Ohio
Filed June 7, 1960, Ser. No. 34,432
11 Claims. (Cl. 35—12)

This invention relates to method and apparatus for producing a visual display, and more specifically, to improved method and means for producing a realistic visual display of terrain or other ground surface areas for use in conjunction with flight training equipment. By use of the invention in conjunction with a conventional modern electronic flight simulator, a student pilot may be enabled to practice aircraft landings, under various fog, weather and environmental conditions. The visual display is connected to be operated by output quantities commonly provided by conventional flight simulators, so that the scene observed by the student pilot is not pre-programmed, but rather depends upon the simulated location and attitude of the simulated aircraft being "flown" by the student pilot, as determined by his manipulation of the aircraft controls. The value of any aircraft trainer visual display as far as training is concerned depends to a large degree upon its realism.

The present invention employs a moving film strip which passes between a point light source and a suitable rear projection screen. The back projection embodiment of the invention readily lends itself to direct viewing by the student pilot without the necessity of auxiliary television equipment, and placement of this projection system and screen directly in front of the pilot's windshield affords an improved display over that realized with a TV monitoring system. Relative displacement of the approach and runway pattern with respect to aircraft attitude and displacement along the glide slope, is achieved by rotational and vertical and transverse displacement of the film strip with respect to the fixed light source. In an alternative embodiment of the invention the scene cast on the rear projection screen may be televised and then observed by the student either on a television monitor, or on a screen to which an image is projected by a conventional television projector.

Prior television visual display systems are known. They are expensive and difficult to maintain, however, and due to their limited resolution and "granularity," the present system offers considerable advantages over these television systems of the prior art. The present invention is considerably less complex than a television visual display system and, hence, the present invention is much easier to maintain and repair. In order to provide utmost realism through use of color, the prior art television visual display systems require extremely expensive and currently unreliable color television techniques, while the present invention, on the other hand, merely requires that a color transparency be provided in place of a black-white one. The present invention also has advantages over television systems in that it does not depend upon the stability of critical circuits which must be calibrated and adjusted. The invention has no "flicker" problem, and it provides much better resolution and truer perspective than television systems. Since the viewing screen of the present invention is flat, the image is not distorted by its position on a curved surface relative to the eye, which type of distortion is significant on a television screen when the screen is viewed from a position close to the screen. Also, the present invention is in no way limited as to field of view by the dimensions of commercially available television picture tubes. Television systems employ screens having considerable persistency in order to display a continuous picture. Persistency, however, tends to make stationary lights appear unrealistically brighter than moving lights, and cause moving lights unrealistically to appear streaked. It is one object of the invention to obviate this difficulty.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings.

Figures 1, 3:
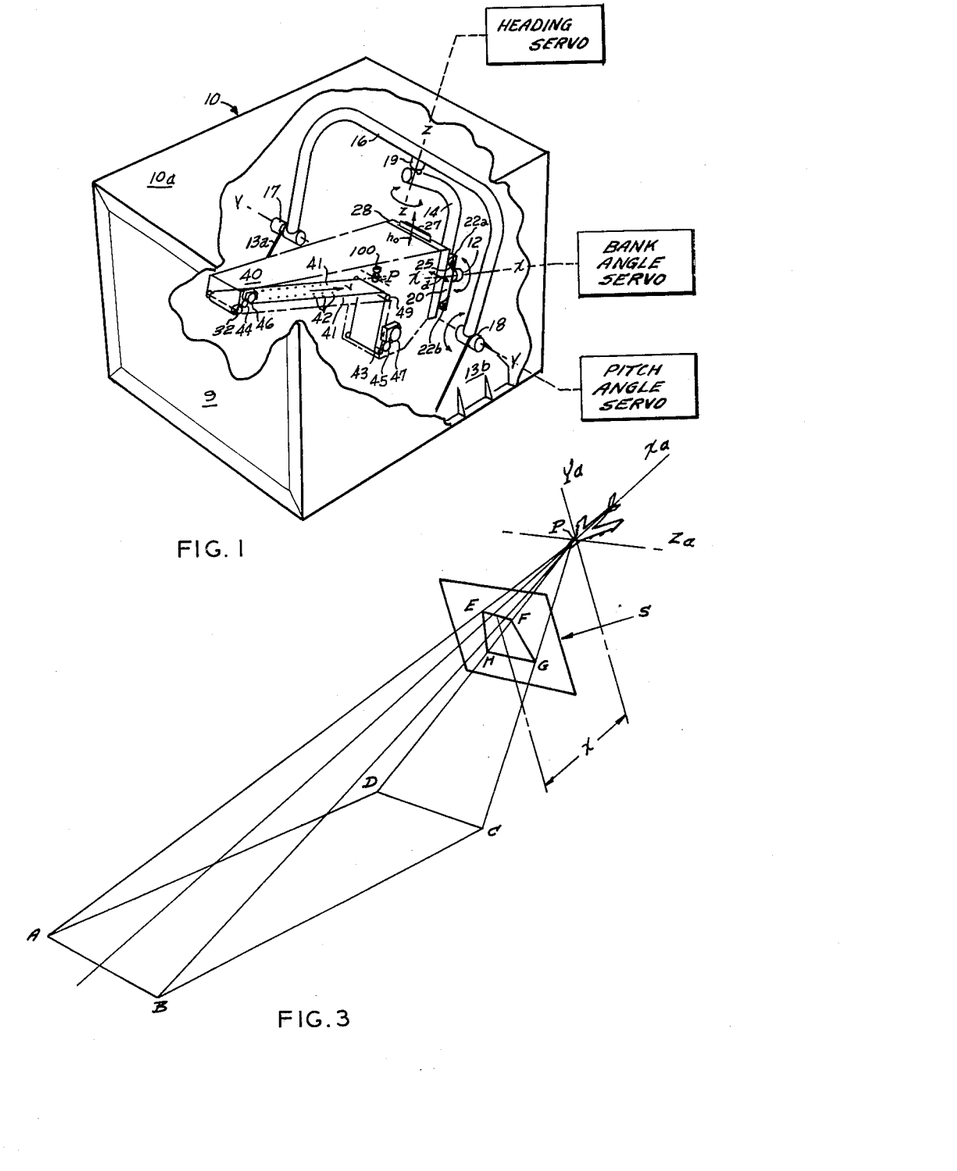
FIG. 1 is a perspective view of the projector portion of an illustrative embodiment of the invention.
FIG. 3 is a geometric diagram showing an aircraft approaching a runway and illustrating various aspects of the projection problem solved by the invention.

The problem involved in producing a display with the proper perspective may be understood by reference to FIGURE 3. FIGURE 3 shows the basic conditions, P is the pilot's position in space relative to any portion of a given runway which is defined by points A, B, C, D. Lines PA, PB, PC, and PD determine the field of vision obtended by the pilot's eye. If we take a random plane S in space, which is perpendicular to the line of aircraft flight $X_a$ and intercept lines PA, PB, PC, and PD, it is seen that a projection of runway ABCD is defined by points EFGH. The size of projection EFGH is dependent on the location of plane S with respect to points P. Shape of the projection is dependent on the relative position of P with respect to ABCD. Each point on plane S will, therefore, appear to the pilot in the same perspective as the runway he is viewing. It will be seen that if a projected image EFGH could be reproduced on the screen located in exactly the same position relative to the pilot's field of vision as plane S, he would receive the impression that he was actually viewing the real runway.

Figure 4:
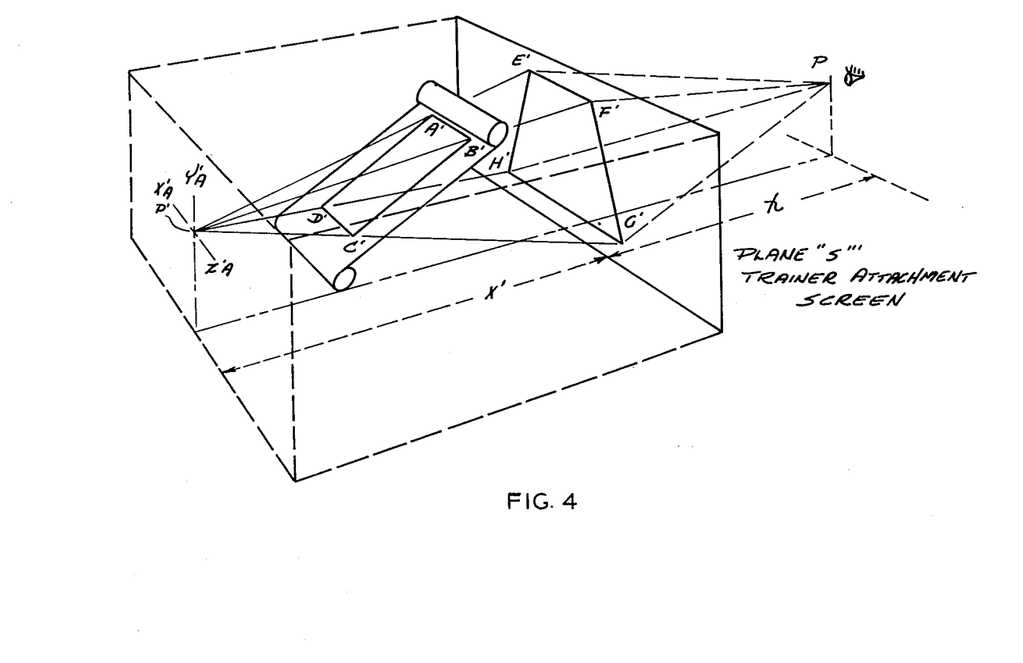
FIG. 4 is a geometric diagram illustrating how point light source projection may be used in the present invention.
Figure 5:
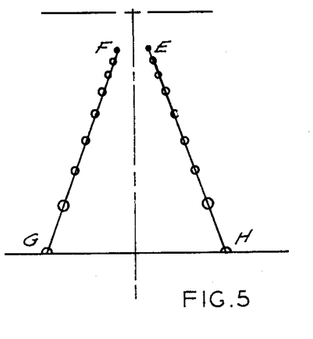
FIG. 5 is a diagram illustrating the appearance that a group of airfield runway lights might present to an approaching pilot.

The basic geometry involved in the system of the present invention may be better understood by reference to FIGURE 4. A point source of light P' is located in such a position as to project through a film upon which points A'B'C'D' are presented in exact scales to points ABCD of the actual runway. Rays from point source P' are projected through the film to a screen located at distance X' from point source. In order to achieve a true perspective under all conditions, distance X' must equal distance X. As can be seen from FIGURE 4, if the point light source remains stationary with respect to the screen, and the film moves in a scale manner to simulate the motions of an aircraft, the projection image E'F'G'H' would vary in size and shape and position on the surface of the screen. The present invention involves a projection system that can either be placed directly in front of the student with the simulated runway presented on a screen directly viewable by the student, or the image on the screen may be televised to a remote location shown to the student on a television monitor, or, with use of a television projection system, the image may be projected onto a screen for viewing by the student. FIGURE 5 is a view showing what a pilot in an aircraft sees as he approaches a runway at an altitude of several hundred feet, where a plurality of runway lights extend along the side of the runway. It will be noted that the lights near the far end of the runway appear to be closer together than nearer lights due to the illusion of perspective.

Figure 6A:
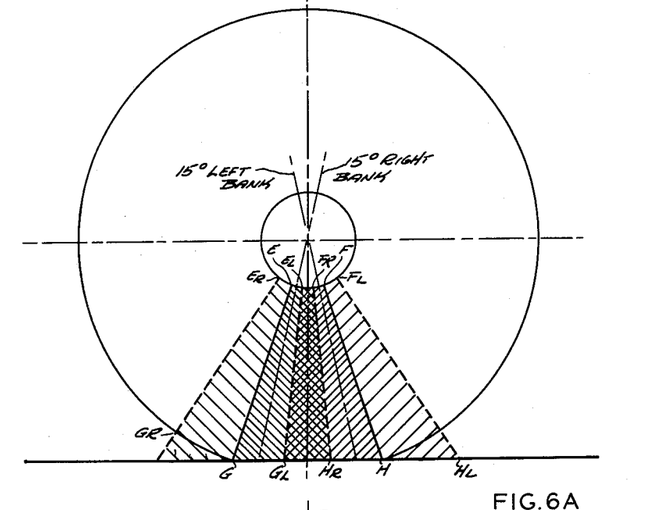
FIGS. 6a–6e are diagrams illustrating, by comparison with FIG. 5, the changes in appearance the image must take due to changes in aircraft roll, heading, pitch, lateral position and altitude.

Roll is defined as rotation of the aircraft around its X axis. From FIGURE 3, it is seen that if the pilot's eye at point P is assumed to be on the roll axis, it will not change position in relationship to runway ABCD during roll. However, plane S under normal conditions would have imaginary reference lines related to aircraft position in level flight superimposed on image EFGH, so that roll of the simulated aircraft rotates plane S while image EFGH maintains its position. From this it is seen that since the screen remains stationary, the impression of roll may be obtained by shifting the image a corresponding number of degrees in the opposite direction to the simulated aircraft roll. Image EFGH is not changed, however, in size or shape to simulate changes in roll attitudes. The loci points of the image will scribe a series of concentric circles about the projected X axis, which is also the pilot's line of sight in FIGURE 3. FIGURE 6a shows how image EFGH would appear under conditions of 30° of roll 15 degrees in either direction. This condition is simulated in the present invention by varying the film position with respect to the point light source. Since the image only changes position and not size or shape, all distances from light source to the film and film to the screen must remain constant. This is accomplished by rotating the film around an axis through point P prime, the light source, and perpendicular to the screen face. This is shown in FIGURE 4, as the X prime axis.

Pitch is defined as rotation around the aircraft Y—Y axis.

Figure 6B:
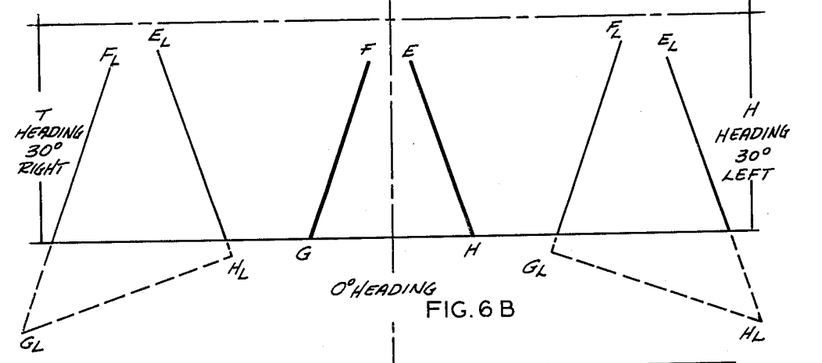
Figure 6C:
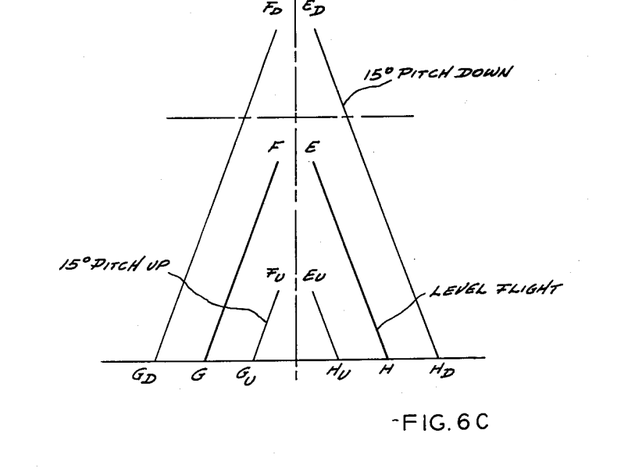
Figure 6D:
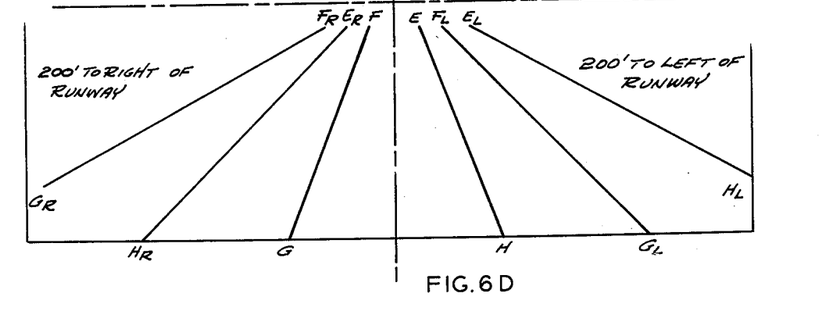
Figure 6E:
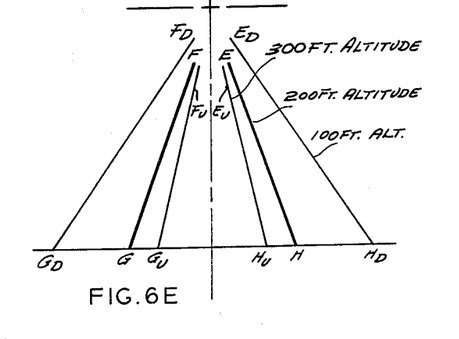

FIGS. 6a–6e illustrate how changes in aircraft attitude and position serve to vary the size, shape and location of the runway. The heavily-shaded trapezoid symmetrically located on the runway centerline shows the runway as seen with no bank angle, while the lightly shaded areas illustrate the shape the runway would take for banking attitudes of 15 degrees, left and right, trapezoid $E_R F_R H_R G_R$ being that of the right bank. FIG. 6b illustrates changes due to aircraft heading changes, FIG. 6c illustrates changes due to changes in aircraft pitch attitude, FIG. 6d illustrates changes due to changes in aircraft lateral position with respect to the runway, and FIG. 6e illustrates changes due to changes in simulated aircraft altitude above the runway. In each of FIGS. 6a–6e, lines FG and EH represent the left and right sides, respectively, of the runway.

Figure 2:
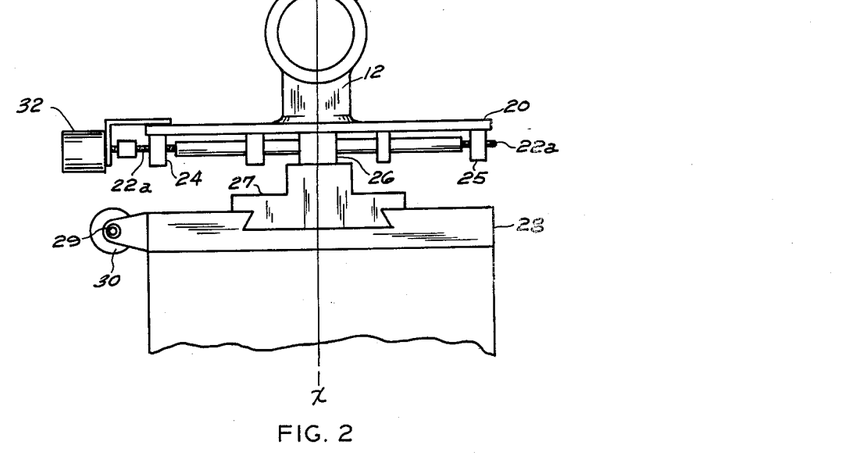
FIG. 2 is a view showing details of the film carriage altitude and lateral position drives.

FIGURE 1 shows an illustrative embodiment of the projector portion of the invention in perspective. The projector, 10 of the invention is carried within a housing, 10a, gimballed about an axis, X—X by means of shaft 12 which is supported by gimbal 14, in a manner better seen in FIGURE 2. As the projector rotates about X—X, banking or rolling motions of the aircraft are simulated. Within housing 10a are base members, 13a and 13b, which supports outer gimbal 16, which is pivotable about pitching axis Y—Y at pivots 17 and 18. Journaled in outer gimbal, 16, at 19 is inner gimbal 14, which is rotatable about axis Z—Z to simulate turning motions of the aircraft. The three gimbal axes of the structure described are mutually perpendicular, and they intersect at point P, the location of point light source 100. Thus pitch, roll and yaw are introduced to the film in FIG. 1 by angular motions through the outer gimbal ring, middle gimbal ring and inner gimbal ring, respectively. Altitude is simulated by linear movement of the film strip in a direction perpendicular to the plane of the strip, transverse travel by linear sidewise movement of the film strip, and longitudinal travel by linear feeding motion of the strip in the runway direction.

Carried on shaft 12 is a base plate 20 upon which are carried a lead screw 22a and a guide bar 22b. Lead screw 22a is rotatably supported in bearings 24, 25. Base member 26 is internally threaded at its top to engage lead screw 22a, and provided with a through bore to engage guide bar 22b. As lateral travel drive motor 32 rotates lead screw 22a, base 26 and its integral slide portion 27 which carry a film carriage to be described, is translated in the direction indicated in FIGURE 1 by arrow d. This motion simulates travel of the aircraft in a horizontal direction perpendicular to the center line of the simulated runway, or more precisely, in a direction perpendicular to the center line of the film strip or belt. Film carriage member 28 is keyed to base 27 to allow vertical travel of the film carriage in a direction indicated by arrow ho in FIGURE 1 to simulate changes in altitude. A portion of member 28 is threaded so as to engage the shaft 29 of drive motor 30, which is adapted to drive film carriage member 28 up and down.

Film carriage 28 includes a housing 40 inside which is disposed a film belt or strip 41. Film belt 41 is mounted on rollers 32, 43, which are driven through gears 44, 45, respectively, by means of film drive motors 46, 47. Motor 47 is used to drive the film in the direction indicated by arrow V in FIGURE 1, and rewind motor 46 is used to drive the film in the opposite direction, after a problem has been run. It will be apparent that an endless belt may be made of film 41, and then a single motor used to position the film.

The axes of rotation of film drive spool 32, 43 and the axis of rotation of idler roller 49, all are parallel to the lead screw 22a and guide bar 22b.

Film belt 41 may comprise a photograph of a ground scene, such as an airport runway, in true scale, without perspective or other distortion contained in the photograph, or alternatively, when runway lights for night landing are to be simulated, film 41 may comprise an opaque belt having a plurality of openings 42, which allow light from point source 100 through translucent or transparent belt 41.

In one successful embodiment of the invention, a film strip approximately 180 inches long by 1 inch wide was used, with about 120 inches used to produce an approach and runway light pattern, with the remainder of the film used for winding and reeling purposes. The scale on the film was 100 feet to the inch.

Belt 41 may be driven at a speed corresponding to the component of aircraft ground speed taken in the direction of the runway, in a manner well-known to those skilled in the art. Motor 30 may be controlled by the simulator altitude servo, and motor 32 may be a servo motor positioned in accordance with the lateral displacement of the simulated aircraft from the runway centerline, in a manner also well known in the grounded trainer art. In FIG. 1 film 41 contains a pattern of transparent dots forming a scale pictorial of the approach and runway lights against an opaque background. Film 41 should be constructed of a dimensionally stable material, such as "Mylar," but in some cases metal bands or tapes will be preferred. It is seen in FIG. 1 that belt 41 is driven at scale velocities through six degrees of freedom to produce projected light patterns on the screen which, at all times, maintain the proper size, location and perspective to represent the relationship between the simulated aircraft and the runway.

In a successful version of the invention, the projection screen was approximately 30 by 40 inches. The field of view of this screen, representing a pilot's field of view through a rectangular opening having a 27 inch diagonal, can be viewed by television camera, such as Vicon type V945. Because of the high intensity of most commercially available point light sources, no auxiliary lighting is required for television pickup, which is an advantage over direct viewing television pick-up systems. The light passing through film 41 from point light source 100 provides an image which is projected downwardly and forwardly through the film to be cast on rear projection screen 9, which may comprise any of a number of well-known translucent rear projection screen means, such as ground glass, but preferably a glass bead coated plastic, such as Polacoat on Plexiglas. For proper perspective it is necessary that the screen be equidistant between the observer's eyes and the light source, as, for example, thirty inches in the embodiment described. As mentioned above, in some applications of the invention, it may be considered desirable to use a conventional television pick up and reproduction system to pick up the scene cast on screen 9 and present it to a student either on an ordinary television cathode ray tube, or by means of a television projection system on a conventional motion picture screen. Since the details of the conventional television equipment which may be used in conjunction with the invention form no part of the present invention, they need not be shown nor described in detail. By projecting the image on a flat screen which remains a fixed distance from the television camera, sharp focus may be assured at all times, which is an important advantage over those prior direct-viewing television systems which required that the camera view the belt diagonally and change position with respect to the belt, since such prior systems require an extremely long depth of focus if the entire picture is to be in sharp focus.

The input motions applied to the apparatus of FIG. 1 all may be derived in straightforward manner from conventional aircraft simulators. The roll motion introduced at shaft 12 may be derived from the bank angle servo generally available in aircraft flight simulators and generally used to operate the roll motion of the simulator attitude gyro. The yawing motion may be introduced from a simulator heading servo, and the pitching motion may follow the simulator pitch angle servo. Since the use of servo position repeaters to follow simulator servo mechanisms is well known, and since a detail showing of the servo motors in FIG. 1 would serve to obscure the important optical features therein, these mechanical drive arrangements of the three servos utilized to provide Euler angle inputs have not been shown. Furthermore, various other gimballing arrangements may be substituted without departing from the invention.

Figure 7:
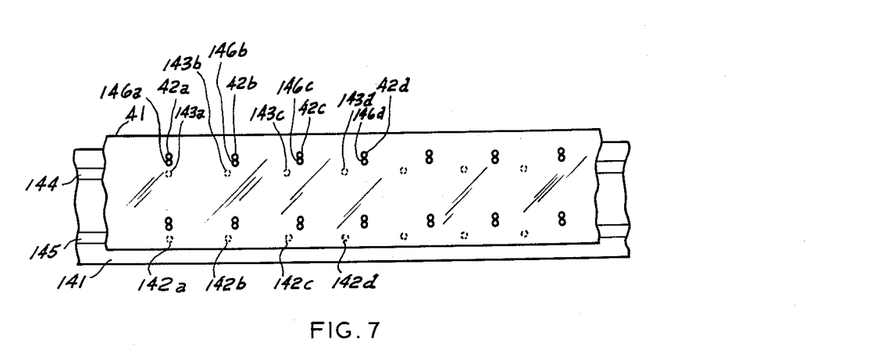
FIG. 7 is a diagram illustrating how sequencing of stroboscopic lights or the like may be realistically simulated.
Figure 8:
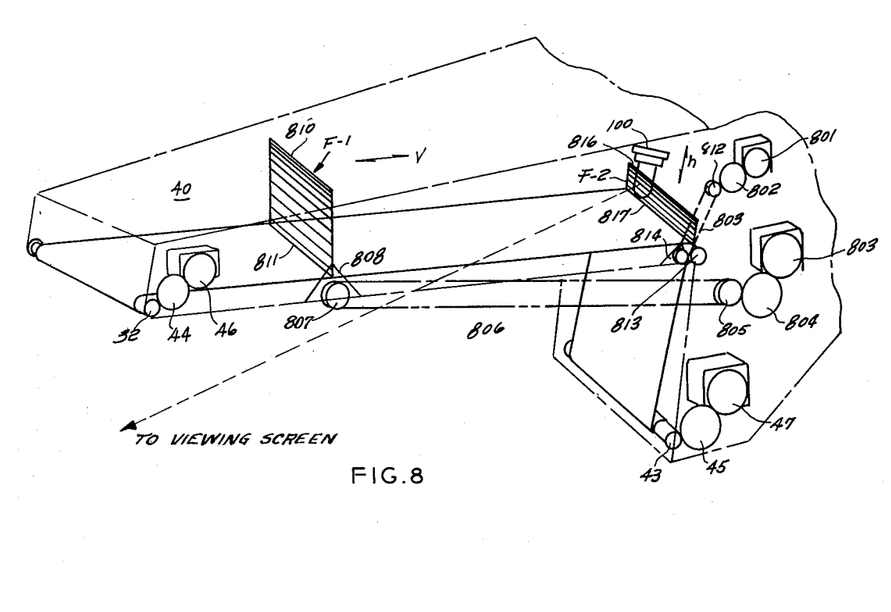
FIG. 8 is a perspective view of a modified form of the invention incorporating two variable filters.
Figure 9:
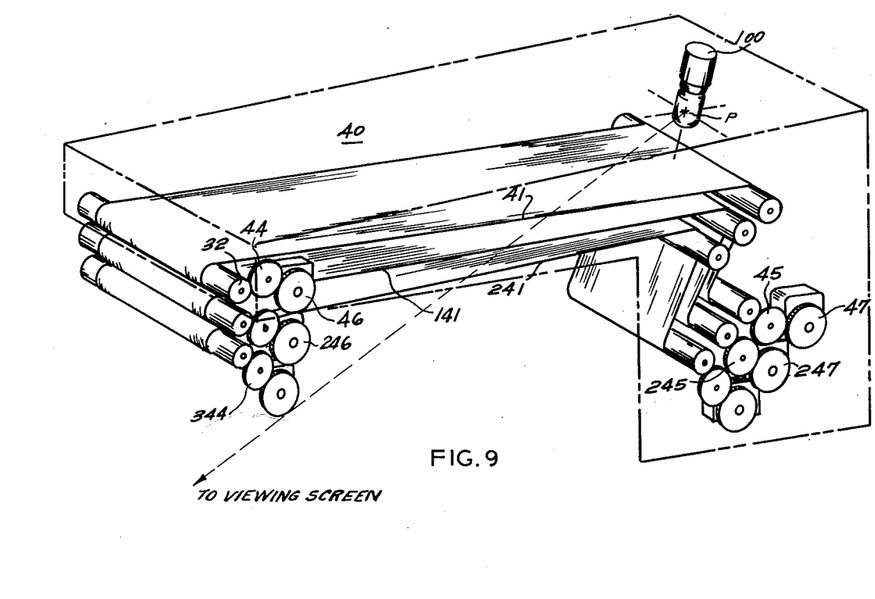
FIG. 9 is a perspective view of a further form of the invention illustrating the manner in which superimposed films may be controlled.

To simulate the flashing, in sequence, of the condensor discharge, or "strobe" lights used along some runway approaches, an arrangement following FIGS. 7 and 9 may be used. A second film or mask 141 may be placed adjacent film 41, preferably in direct light rubbing contact therewith. In FIG. 7 the two films are shown displaced laterally solely for ease of illustration, and when in use the lines of holes should superimpose. It will be seen that main film 41 has its holes spaced on it at regular intervals, in the manner of light spacing on airfield runway approaches. The holes in rows 142 and 143 on film 141, however, have an increasing spacing toward the right. Thus, if film 141 in FIG. 7 is given a gradual translation to the right relative to film 41, pairs of holes in row 42 of film 41 and row 143 of film 141 will coincide in a sequence advancing to the right as seen in FIG. 7. As the pairs of transparent holes overlap, light from the continuously burning point source passes through during the time of overlap, very realistically simulating the flash of an arc discharge approach light. Thus during the time strobe film 141 is driven in synchronism with main film 41 and no holes in the two films overlap no simulated strobe lights are seen. When film 141 is retarded, however, relative to film 41, a sequence of flashes advancing toward the simulated runway may be provided. Thus FIG. 7 illustrates the principle by which strobe lights are simulated. If desired, film 141 may be provided with a repetitive pattern so that plural sequences of strobe lights may be simulated. To prevent wrong sequencing due to a given hole in film 41 flashing when mating with more than one hole in belt 141, a mask on a third belt may be used, in the same arrangement as shown in FIG. 9, to blank off such erroneous flashes. If the strobe lights being simulated have a varying lateral spacing, so that the holes on belts 41 and 141 used to simulate the strobe lights also have a varying lateral spacing no blanking mask may be necessary, since successive lights may be in laterally spaced tracks, and a given hole will cause a flash only when required. If it also is desired to provide simulated steadily-burning lights adjacent each discharge light, transparent bands such as 144, 145 may be provided on film 141 to continuously allow light from further rows of holes 146a, etc., on film 41. Holes 146a, 146b, etc., obviously may merely comprise widened portions of holes 42a, 42b, etc. In the modified embodiment of FIG. 8, filters F-1 and F-2 are provided to simulate varying visibility conditions. Filter F-1 is shown as comprising a graduated filter which is darker near its top portion 810 than its lower portion 811. Mount 808 carries filter F-1 and it is driven in the direction indicated by arrow V by means of sprockets 805 and 807, and chain 806, motor 803 driving the sprocket-chain combination via gear 804. As filter F-1 is driven toward light source 100, worsened visibility conditions are simulated.

Filter F-2 is a graduated filter which is moved in a vertical direction as shown by arrow h by means of motor 801, gear 802, and a sprocket-chain combination comprising sprockets 812 and 813 and chain 803. Rotation of motor 801 serves to translate mount 814 and filter F-2 mounted therein in the desired direction. Filter F-2 is also a graduated filter which is darker near its top portion 816 than its bottom portion 817. Filters F-1 and F-2 are made so that they can be adjusted vertically within their own planes by the instructor.

FIGURE 9 shows superimposed three films 41, 141 and 241. The functions of main film 41 and strobe lights film 141 have been set forth above in connection with FIGURES 1 and 7. The function of film 241 is to provide a variable cloud simulation. Film 241 is covered with irregular and random splotches of light-absorbing character, so that when translated, in the same manner as films 41 and 141, it will provide occasional changes in picture quality simulating the occasional changes in light intensity which occur when flying through scattered clouds.

In FIG. 9, film 141 shown being positioned by motors 246 and 247 which operate through gears 244 and 245 to drive spools or rollers upon which the film is carried. Main film 41 and "flashing light" film 141 preferably are located as close together as possible. Although FIG. 9 shows a double-ended belt system for each of the three films shown therein, three endless belts may be used in FIG. 9, with, for example, main film 41 completely surrounding the other two belt systems, FIG. 9 clearly indicates that plural film strips may be superimposed in the invention to cooperate in producing a realistic visual display.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Visual display apparatus, comprising in combination: a point light source; a film belt having indicia thereon which is an undistorted small-scale facsimile of a grounded surface area, said belt being supported on a carriage having at least one roller and said film being capable of being driven longitudinally along a first axis; first means for translating said film carriage with respect to said point light source within a plane which is perpendicular to said first axis; second means for rotating said film independently about three mutually perpendicular axes which intersect at the location of said point light source; and a translucent screen viewing-surface positioned to receive light from said point source which passes through said film belt.

2. Apparatus according to claim 1 in which said film belt comprises an opaque belt having a plurality of transparent dots thereon in the pattern of lights near an airfield runway.

3. Apparatus according to claim 1 in which said film belt comprises an opaque belt having a plurality of holes arranged in the pattern of lights near an airfield runway.

4. Apparatus according to claim 1 in which said film belt comprises a photographic film having a picture of ground surface including portions of an airfield runway.

5. Apparatus according to claim 1 in which said first means comprises first and second motive means arranged to be operated independently to translate said film carriage in two respective mutually perpendicular directions in said plane.

6. Apparatus according to claim 1 in which said second means comprises a set of gimbals capable of providing rotation about three mutually perpendicular axes.

7. Apparatus according to claim 1 having a television camera viewing said viewing surface to provide video image signals, and a television projector operated by said video signals to produce a second image for viewing by a student.

8. Apparatus according to claim 1 having a variable density optical filter positioned between said point source and said viewing surface.

9. Apparatus according to claim 1 having a variable density optical filter positioned between said point source and said film belt.

10. Apparatus according to claim 1 having a variable density optical filter positioned between said film belt and said viewing surface.

11. Apparatus according to claim 1 in which said second means comprises a first member rotatable about a first gimbal axis to simulate banking, a second member carried on said first member and rotatable about a second gimbal axis to simulate pitching, and a third member carried on said second member and rotatable about a third gimbal axis to simulate yawing, said first means being attached to said third member.

References Cited in the file of this patent

UNITED STATES PATENTS

| 2,711,593 | Lewis et al. | June 28, 1955 |
| 2,839,840 | Hemstreet | June 24, 1958 |
| 2,961,778 | Deflorez et al. | Nov. 29, 1960 |
| 2,981,008 | Davis et al. | Apr. 25, 1961 |

FOREIGN PATENTS

| 554,518 | Canada | Mar. 18, 1958 |
| 577,566 | Great Britain | May 23, 1946 |